United States Patent [19]
Aihara et al.

[11] Patent Number: 5,300,166
[45] Date of Patent: Apr. 5, 1994

[54] APPARATUS FOR MANUFACTURING A WEB AND METHOD

[75] Inventors: Kintaro Aihara, Chiba; Tadashi Honda, Tokyo; Masashi Kobayashi, Kisarazu; Hideyo Rohyama, Yokohama; Kazuhiko Kurihara, Tokyo; Hiroshi Yazawa, Kunitachi; Toshikazu Ohishi, Kawaguchi, all of Japan

[73] Assignees: Nippon Petrochemicals Co., Ltd.; Polymer Processing Research Institute, Ltd., both of Tokyo, Japan

[21] Appl. No.: 33,418

[22] Filed: Mar. 18, 1993

Related U.S. Application Data

[63] Continuation of Ser. No. 746,778, Aug. 16, 1991, abandoned.

[30] Foreign Application Priority Data

Aug. 17, 1990 [JP] Japan .................. 2-215818

[51] Int. Cl.$^5$ ............................................. B32B 31/00
[52] U.S. Cl. ..................... 156/160; 156/163; 156/164; 156/229; 156/359; 156/516; 156/543; 156/559
[58] Field of Search ............... 156/359, 229, 157, 160, 156/159, 161, 163, 164, 543, 544, 552, 559, 516, 583.1; 428/515

[56] References Cited

U.S. PATENT DOCUMENTS

| | | | |
|---|---|---|---|
| 3,644,163 | 2/1972 | Schwarzkopf et al. | 156/583.1 |
| 3,767,510 | 10/1973 | Gustafson | 156/543 |
| 3,772,107 | 11/1973 | Gentile et al. | 156/62.8 |
| 3,982,991 | 9/1976 | Hamm et al. | 156/251 |
| 4,268,345 | 5/1981 | Semchuck | 156/583.1 |
| 4,455,189 | 6/1984 | Takasuga | 156/157 |
| 4,551,378 | 11/1985 | Carey, Jr. | 156/62.4 |
| 4,720,415 | 1/1988 | Vander Wielen et al. | 156/164 |
| 4,743,334 | 5/1988 | Singer | 156/583.1 |
| 4,749,423 | 6/1988 | Vaalburg et al. | 156/309.6 |
| 4,790,901 | 12/1988 | Keetelhoit et al. | 156/583.1 |
| 4,964,944 | 10/1990 | Christine et al. | 156/515 |
| 5,028,294 | 7/1991 | England | 156/515 |
| 5,074,951 | 12/1991 | Banco et al. | 156/515 |

FOREIGN PATENT DOCUMENTS 56-53259 5/1981 Japan .

*Primary Examiner*—D. Simmons
*Assistant Examiner*—William J. Matney, Jr.
*Attorney, Agent, or Firm*—Zarley, McKee, Thomte, Voorhees & Sease

[57] ABSTRACT

A film is delivered from a delivery roller and another film is delivered from another delivery roller. The two films are introduced between a heater and a receiver. The heater presses the two films against the receiver to bond the films. Then, the rear end of the film is cut off with fusing and the front end of another film is cut off with fusing by wire heaters. The bonded film is transferred through drive and pinch rolls to an accumulator for storing the film and is spread to open slits by holding rolls to form a longitudinal web, which is laminated on a lateral web manufactured in another process to form a reticulate non-woven fabric.

13 Claims, 5 Drawing Sheets

APPARATUS FOR MANUFACTURING A WEB AND METHOD

This is a continuation of copending application(s) Ser. No. 07/746,778 filed on Aug. 16, 1991, now abandoned.

BACKGROUND OF THE INVENTION

The present invention relates to an apparatus for manufacturing a web and an apparatus for manufacturing laminated material based on the web.

There is a known reticulate non-woven fabric in which a longitudinal web which has a number of slits along the length is laminated on a reticulate lateral web which has a number of slits along the width.

In the non-woven fabric, a long sheet-like member or a film(raw fabric) which has a number of slits along the length is delivered and is spread to open the slits and to form a longitudinal web. The longitudinal web is laminated on a lateral web manufactured in another process, so that a reticulate non-woven fabric is manufactured.

The length of film delivered is limited. Therefore, the rear portion of a first film is bonded with the front end of a second film to form a longitudinal web continuously.

There are known bonding methods as follows:
a) Films are bound to each other at several points. That is to say, fibers which are formed between slits in a film are bound to each other, so that they are bonded.
b) Films are bonded with sheet-like bonding material such as an adhesive tape.
c) Films are bonded with sheet-like bonding material such as an adhesive tape, and are further bonded by forming slits having a certain width in the bonded portion. (Japanese Patent Laid-Open Pub. No. 56-53259)
d) Films are bonded by applying or spraying adhesives, or hot-melt.

However, the method "a" requires binding fibers at several points, which is troublesome and has low efficiency. The portions at which fibers are bound generate large cracks which have poor appearance and low strength when a reticulate non-woven fabric is formed by spreading and laminating the films, so that it could not be used as a final product. Thus, in order to exclude the poor portions at further process, it is necessary to rewind it, which is troublesome.

In the method "b", it is necessary to bond a film with another film by sheet-like bonding material, thereby making spreading impossible in spreading process. If it is forcibly spread, a large crack occurs similar to the method "a" and a poor product is manufactured, which needs troublesome rewinding similar to the method "a".

In the method "c", slits which have a predetermined width are formed in the bonded portion with sheet-like bonding material; so spreading would be possible in spreading process. But, when the film is spread, if slits are not minutely formed in the sheet-like bonding material, cracks are formed, thereby not only damaging bonded fibers but also sticking foreign matter thereto. The bonded portion is defective to involve disadvantage similar to the above "a". To form the slits in the bonded portion is not only troublesome, but also necessary to provide a cutter and drive means therefor.

In the method "d", there are disadvantages that adhesive are sticked to films to bond adjacent fibers to each other and to close slits, adhesives are sticked to spreading and transfer apparatus to become dirty, and the bonded portion may peel off owing to heating at thermal compression bonding in further laminating process.

SUMMARY OF THE INVENTION

The object of the present invention is therefore to provide an apparatus for manufacturing a web and an apparatus for manufacturing laminated material on the basis of the web without the disadvantages as above.

According to one aspect of the present invention, there is provided an apparatus for manufacturing a web, the apparatus comprising delivery means for delivering first and second long sheet-like members having a plurality of slits along the length, bonding means for bonding the rear end of the first sheet-like member with the front end of the second sheet-like member with heat seal and spreading means for spreading the bonded sheet-like member continuously to form a web.

According to another aspect of the present invention, there is provided an apparatus for manufacturing laminated material, the apparatus comprising delivery means for delivering first and second long sheet-like members which have a number of slits along the length, bonding means for bonding the rear end of the first sheet-like member with the front end of the second sheet-like member with heat seal, spreading means for spreading the bonded sheet-like member continuously to form a web, and compression means for compressing and bonding the web with another base material with heat to form a reticulate non-woven fabric.

In the apparatus of this invention, the first sheet-like member is bonded to the second sheet-like member without closing slits to form suitable laminated material which comprises longitudinal and lateral webs.

DETAILED DESCRIPTION OF PREFERRED EMBODIMENTS

Figure 1:
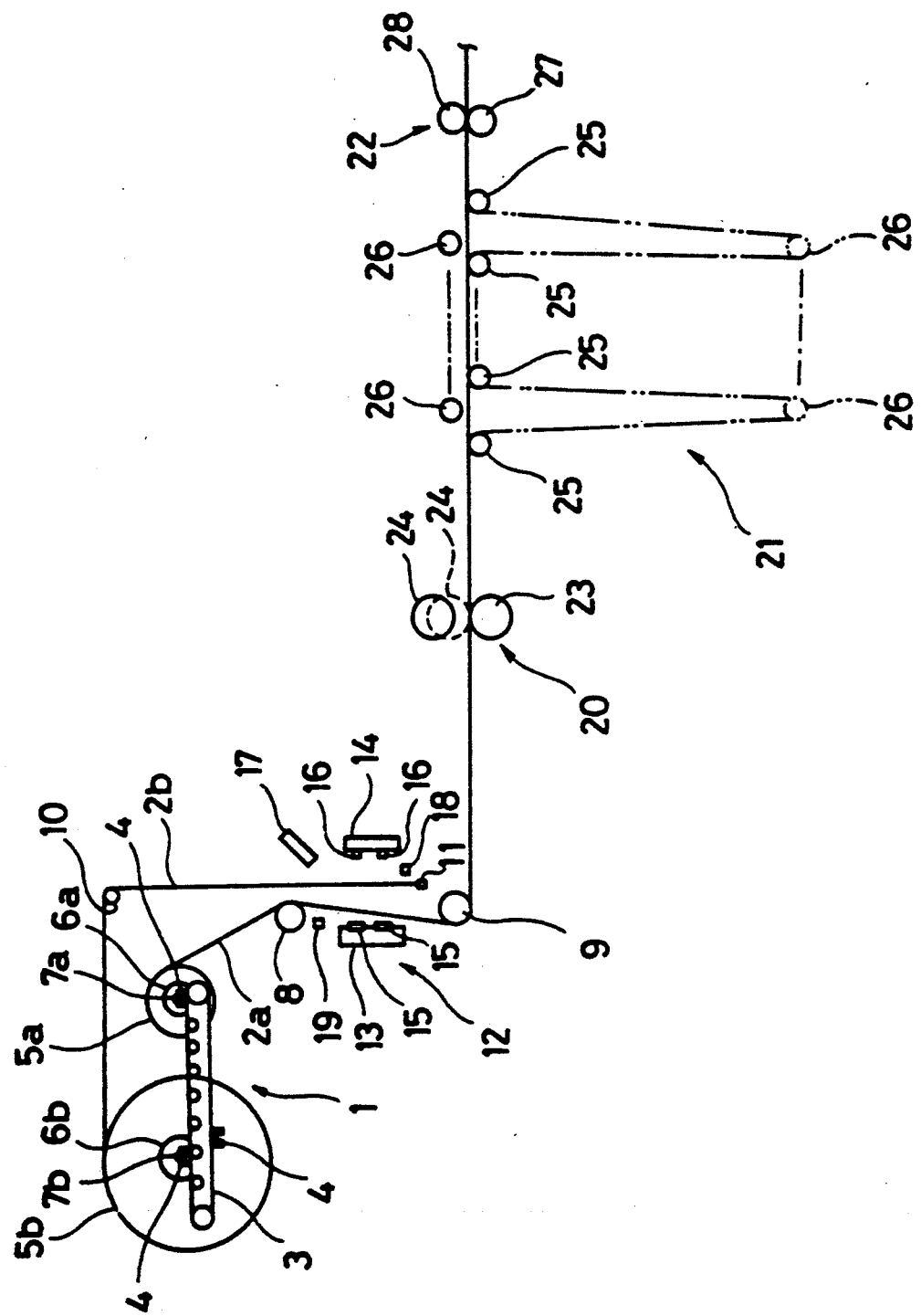
FIG. 1 is a schematic side view of one embodiment according to the present invention in which there are delivery means, bonding means, first transfer means, an accumulator and second transfer means.

In FIG. 1, the numeral 1 denotes delivery means which delivers films (raw fabric) 2a and 2b made of thermoplastic resin and having a number of slits along the length. The delivery means 1 comprises an endless conveyor belt 3, in which there are provided a plurality of bearings 4 which detachably and rotatably receive shafts 7a and 7b of cores 6a and 6b in film rolls 5a and 5b around which the films 2a and 2b are wound. The bearing 4 at the front end of the conveyor belt 3 supports the film 2a firstly delivered, while the bearing 4 at the rear end of the conveyor belt 3 supports the film 2b secondly delivered.

There are provided upper and lower guide rolls 8 and 9 spaced from each other vertically for guiding the first film 2a at the lower front portion, whereby the first film 2a is guided vertically between the guide rolls 8 and 9.

Above the upper guide roll 8, there is provided a rod 10 for suspending the second film 2b along the first film 2a which is guided by the upper and lower guide rolls. The numeral 11 denotes a weight attached to the end of the second film 2b.

Between the upper and lower guide rolls 8 and 9, there are provided bonding means 12 for bonding the rear end of the first film 2a with the front end of the second film 2b. The bonding means 12 comprises a heater 13 and a receiver 14. The heater 13 faces the second film 2b, entering the first film 2a between them. The heater 13 has a plurality of heating portions 15 on the surface which faces the first film 2a. A receiver 14 faces the heater 13, entering the first and second films 2a and 2b between them. The receiver 14 has receiving portions 16 which are corresponding to the heating portions 15 on the heater 13.

In the vicinity of the bonding means 12, there are provided an air spray duct 17 for cooling the first film 2a which is bonded with the second film 2b, a first wire heater 18 for cutting the front end of the second film 2b with fusing after the first film 2a is bonded to the second film 2b, and a second wire heater 19 for cutting the rear end (remainder) of the first film 2a off the film roll 5a with fusing after the first film 2a is bonded with the second film 2b.

Next to the lower guide roll 9, there are first transfer means 20 for transferring the film 2a(2b) at a first speed, an accumulator 21 for storing the film 2a(2b) and second transfer means 22 for transferring the film 2a(2b) at a second speed lower than the first speed.

The first transfer means 20 comprise a drive roll 23 and a pinch roll 24 which is accessible to the drive roll 23 to transfer the film 2a(2b) which is pressed against the drive roll 23 at the second speed when the film 2a(2b) is stored in the accumulator 21.

The accumulator 21 comprises a plurality of stationary rolls 25 at one side of the transferred film 2a(2b) and a plurality of dancer rolls 26 at the other side. The dancer rolls 26 are thus moved from a position close to the stationary rolls 25 to a position apart therefrom when the film 2a(2b) is stored.

The second transfer means 22 comprises a drive roll 27 and a pinch roll 28 for pressing the film 2a(2b) against the drive roll 27.

Figure 2:
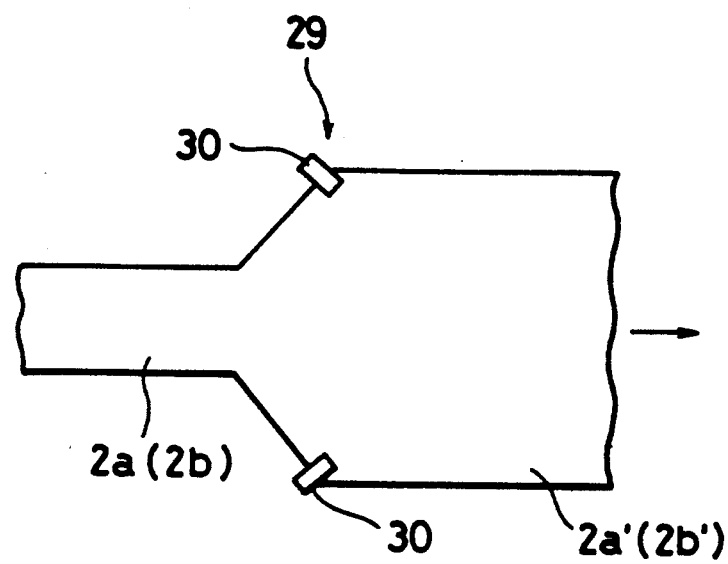
FIG. 2 is a side view of the spreading means.

Next to the second transfer means 22, as shown in FIG. 2, there are provided spreading means 29, which comprise two pairs of holding rolls 30 for transferring two side edges of the film 2a(2b) in an oblique outward direction of the width, thereby spreading the slits of the film 2a(2b) to form a longitudinal web 2a'(2b').

Figure 3:
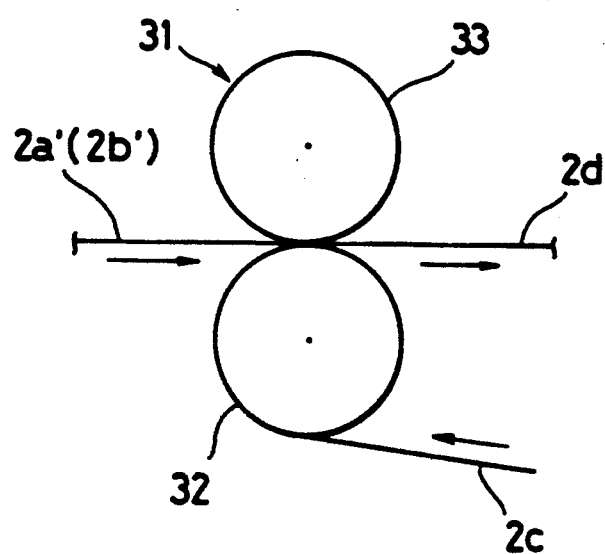
FIG. 3 is a side view of the laminating means.

Next to the spreading means 29, as shown in FIG. 3, there are provided laminating means (compression-bonding means) 31 for laminating the longitudinal web 2a'(2b') with a reticulate lateral web 2c made of thermoplastic resin to spread a number of slits along the width direction. The laminating means 31 comprises a laminating roll 32 for heating the longitudinal web 2a'(2b') and the lateral web 2c, and a rubber roll 33 for pressing the longitudinal web 2a'(2b') and the lateral web 2c against the laminating roll 32.

Figure 4:
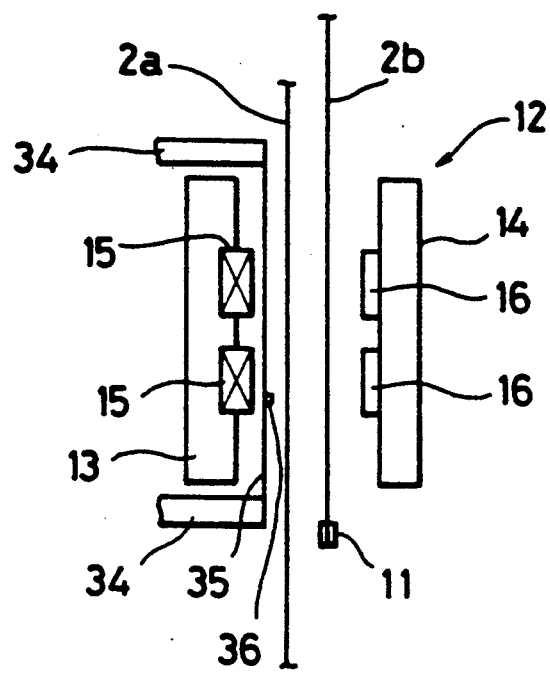
FIG. 4 is a side view of the bonding means.

Further describing the bonding means 12, as shown in FIG. 4, between the first film 2a and the heating portions 15 on the heater 13, there is provided a membrane 35 such as Teflon film mounted on the frame 34 so as to prevent the first and second molten films 2a and 2b from sticking to the heating portions. The receiving portions 16 on the receiver 14 are made of silicone rubber, etc., thereby preventing the first and second molen films 2a and 2b from sticking to the receiving portions 16. Furthermore, there is provided a temperature sensor 36 on the membrane 35 over the heating portions 15.

Figure 5:
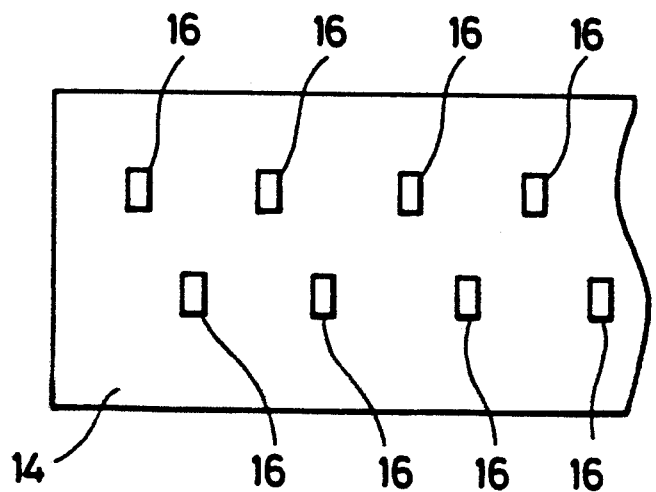
FIG. 5 is a front view of a first embodiment of a receiver in the bonding means.

As shown in FIG. 5, the receiving portions 16 on the receiver 14 constitute two rows in which the receiving portions 16 in an upper row are arranged alternately with those in a lower row. Similarly, the heating portions 15 on the heater 13 are alternately arranged between upper and lower rows.

The operation will be described as follows. As shown in FIG. 1, the first film 2a is delivered from the film roll 5a at a second speed by force of the second transfer means 22, and is fed to the upper guide roll 8, the lower guide roll 9, the first transfer means 20, the accumulator 21, the second transfer means 22 and the spreading means 29.

The film 2a is spread by the spreading means 29 at a predetermined draw ratio as shown FIG. 2, whereby the slits are spread to form the longitudinal web 2a'.

Then, the longitudinal web 2a' is fed to the laminating means 31 and is laminated on the lateral web 2c to form a reticulate non-woven fabric 2a.

Before the remainder on the film roll 5a becomes a few, a next film roll 5b is located on the bearing 4 behind the bearing 4 on which the film roll 5a of the conveyor belt 3 is positioned. The end of the film 2b is suspended substantially parallel with the first film 2a via the rod 10. The film 2b has a weight 11 at the end, so that it is tightly suspended.

When the remainder of the film roll 5a draws to a close, the pinch roll 24 in the first transfer means 20 lowers from a position shown by a solid line to a position shown by a dotted line to pinch the film 2a. Thus, the film 2a is supplied to the accumulator 21 at the first speed by the first transfer means 20. At the same time, delivery speed of the film 2a from the accumulator 21 to the spreading means 29 is kept at second constant speed at all times by the second transfer means 22. Accordingly, the dancer rolls 26 in the accumulator 21 gradually lower depending on difference between the first and second transfer speeds, thereby storing the film 2a in the accumulator 21.

After the film 2a is stored in the accumulator 21, the first transfer means 21 stops and finishes delivery of the film 2a. At this moment, the first film 2a stored in the accumulator 21 is fed to the spreading means 29 at the second transfer speed, so that there is no stop in feeding to the spreading means 29.

Figure 6:
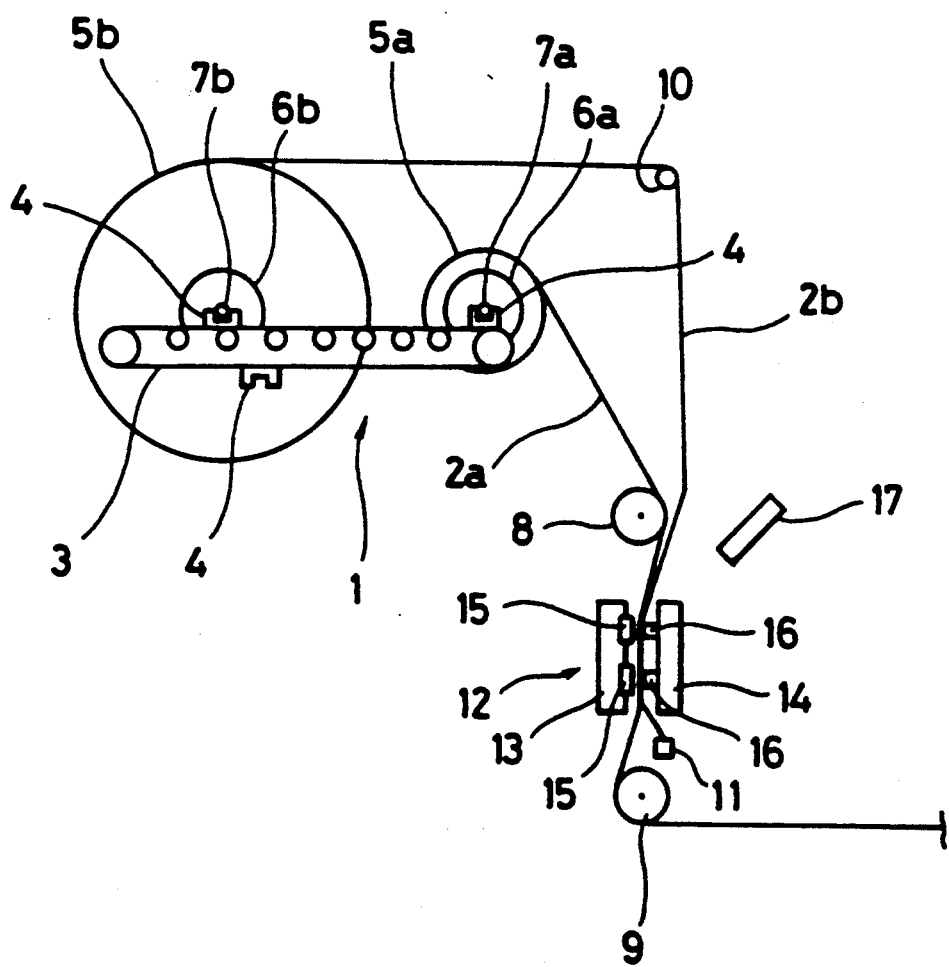
FIG. 6 is a side view for illustrating the operation of this invention.

While the delivery of the film 2a from the delivery means 1 is stopped, the heating portions 15 on the heater 13 become conductive and the heater 13 turns on. As shown in FIG. 6, the receiver 14 is moved towards the heater 13, thereby bonding the first film 2a with the second film 2b with heat seal. The films 2a and 2b include low melting-point adhesive thermoplastic resin as an outer layer to facilitate bonding with heat seal. The receiver 14 presses the films 2a and 2b for predetermined time against the heating portions 15 on the heater 13 having predetermined temperature via the membrane 35 and is returned to the original position in FIG. 1. Air is immediately sprayed through the air spray duct 17, thereby solidifying a bonding portion of the films 2a and 2b with cooling. Accordingly, the first film 2a is completely bonded with the second film 2b.

To obtain suitable bonding, it is necessary to select temperature of the heater 13 and holding time depending on material and thickness of the first and second films 2a and 2b. However, they are greatly variable depending on room temperature. The holding time may preferably be as short as possible since the film storage volume in the accumulator 21 is limited. Thus, it may be preferable to adjust the temperature of the heating portions 15 on the heater 13. In this case, to control the temperature in the heating portions 15 at the condition as close as possible to actual contact temperature, it may be preferable to keep the heating portions at temperature detected by the temperature sensor 36, for example, 40 C., for five minutes. The temperature in the heating portions 15 is experimentally determined so as to perform suitable bonding. The temperature sensor 36 is mounted on the membrane 35 in this embodiment, but may be mounted on the receiving portion 16 on the receiver 14 or heating portion on the heater 13 directly.

Then, the first film 2a is cut with fusing between the bonding portion and the film roll 5a by the wire heater 19. The second film 2b is cut with fusing between the bonding portion and the weight 11 by the wire heater 18. Accordingly, the first film 2a is bonded with the second film 2b. After bonding, the pinch roll 24 in the first transfer means 20 gets away from the drive roll 23. As the first film 2a stored in the accumulator 21 is forwarded out, the dancer roll 26 comes back to the original position. When the first film 2a is all fed from the accumulator 21, the second bonded film 2b is fed at the second transfer speed by the second transfer means 22. Then, the bearings 4 are moved by the conveyor belt 3 to exclude the film roll 5a off the bearings 4 and transfer the film roll 5b to the front end. The rod 10 is removed in a lateral direction.

According to the above structure, the bonding of the films 2a and 2b is performed with heat seal, so that the slits in the films 2a and 2b are not closed and the fibers of the films 2a and 2b can be welded. Thus, the bonded part can be spread smoothly without cracks in the spreading process. Foreign matter such as adhesive tapes is not used. Accordingly, the finish of reticulate non-woven fabric (laminated material) is good enough as to bonded portion.

The films 2a and 2b are bonded at small bonded portions (point-like), and the bonded portion can normally be spread at the spreading means.

To arrange the heating portions 15 on the heater 13 alternately, alternate heating portions may be exposed by partially covering the heater 13 extending in a direction of width of the films 2a and 2b.

Figure 7:
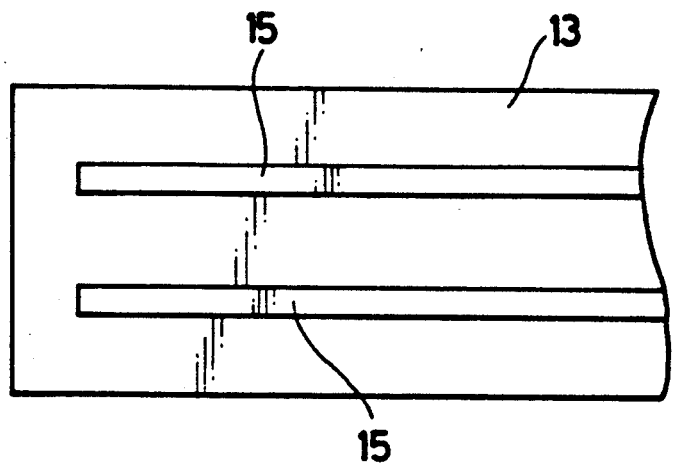
FIGS. 7 to 9 illustrate other embodiments of heating means.
Figure 8:
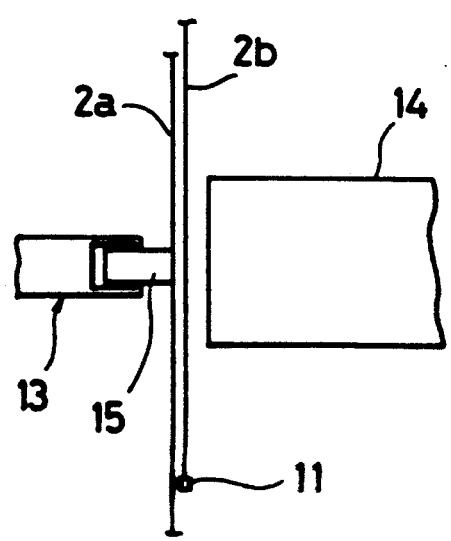
Figure 9:
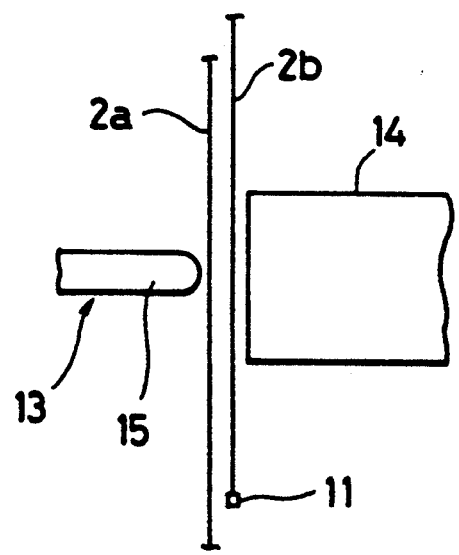

In the foregoing embodiment, the heating portions 15 are bonded to the receiving portions 16 at alternately-arranged points, but other embodiments may be carried out. For example, as shown in FIG. 7, two elongated heating portions 15 which extend in a direction of width may be provided in parallel. It is not limited to two, but one or more is possible. The heating portion 15 may comprise a roller 15 rotatably mounted as shown in FIG. 8, or a round ended bar 15 as in FIG. 9. The films 2a and 2b are pressed against the receiving portions 14 by the roller or bar; at the same time, the roller or bar may move in a direction of width of the films 2a and 2b. In this case, it is unnecessary to spray cooling air. Furthermore, hot blast may be jetted towards the longitudinal web through a thin nozzle which moves in a direction of width of the longitudinal web. Also, other hot seal methods such as high-frequency dielectric heating or ultrasonic vibration heating may be used.

Either longitudinally stretched or unstretched films 2a and 2b may be used. In case that stretched film is delivered, heat seal of films may be performed at temperature such that stretching effect is not lost. In case that multi-layer film which consists of a substrate and low melting point bonding layers is used as films 2a and 2b, bonding may be performed by welding the low melting point bonding layers. Further, in case of a single layer without bonding layers, bonding may be performed by welding only the surface. To weld only the surface, for example, ultrasonic vibration heating may be used.

Furthermore, spreading means are not limited to the foregoing embodiments, but may be in a method of contacting a curved bar; in a method as described in Japanese Patent Pub. No. 46-43275; in a method as described in Japanese Patent Pub. No. 50-40186; and in a method of the combination of the above. Delivery means are not limited to the above embodiments, but may be of turret-type.

The foregoing merely describes preferred embodiments of this invention, but various changes and modifications may be possible by a person skilled in the art without departing from the scope of claims as below:

What is claimed is:

1. An apparatus for manufacturing a web, the apparatus comprising:

delivery means for delivering first and second long sheet-like members having a plurality of slits along the length, the first and second sheet-like members comprising first and second films, respectively;

the delivery means comprising first guide means for feeding the first film in a substantially vertical direction, and second guide means for suspending the second film along the first film;

the first guide means comprising upper guide means for guiding the first film downwardly and lower guide means for forming a vertical feeding portion of the first film between the upper guide means;

the second guide means comprising a weight which is attached to the front end of the second film and support means for supporting the second film so that the front end of the second film is vertically suspended along the vertical feeding portion of the first film;

bonding means for overlapping and bonding the rear end of the first film with the front end of the second film;

the bonding means comprising heating means and receiving means which face each other and are accessible to each other, the first and second films passing between the heating and the receiving means, each comprising one or more heating and receiving portions respectively;

said first and second films each being comprised of a net-like material;

said bonding means forming a continuous sheet which comprises a first portion of a single layer of the first film, a second portion of two layers in which the first film is bonded to the second film, and a third portion of a single layer off the second film;

the bonding means further comprising an air spray duct for cooling and solidifying the film, a first wire heater for cutting the rear end of the first film with fusing and a second wire heater for cutting the front end of the second film with fusing, said first and second films having bonded portions in overlapped condition adjacent the front end of the second film and adjacent the rear end of the first film, respectively, said first wire heater adapted for cutting off the front end of the second film from said bonded portion of said second film, and said second wire heater adapted for cutting off the rear end of the first film from said bonded portion of said first film; and spreading means for continuously spreading the sheet which comprised said first, second and third portions to form a web.

2. An apparatus as defined in claim 1 wherein the heating and receiving portions constitute a plurality of rows respectively and are alternately arranged between the adjacent rows.

3. An apparatus as defined in claim 1 wherein the heating and receiving portions comprise a projection extending in a direction of the width of the heating and receiving means respectively; said heating portion adapted to move laterally with respect to the width of said films.

4. An apparatus as defined in claim 1 wherein the heating portion comprises a roller which is adapted to press the film rotatably against the receiving means; said heating portion adapted to move laterally with respect to the width of said films.

5. An apparatus as defined in claim 1 wherein the heating portion comprises a rod which has a round end which is adapted to press the film against the receiving means.

6. An apparatus as defined in claim 1 wherein a membrane is mounted on a frame of the heating means between the heating means and the film to prevent the film from sticking to the heating means.

7. An apparatus as defined in claim 6 wherein the membrane comprises a temperature sensor which faces the films to control the temperature of the heating portion.

8. An apparatus as defined in claim 1 wherein the spreading means comprise two pairs of holding rolls for feeding the ends of the film in an oblique outward direction.

9. An apparatus as defined in claim 1 further comprising first transfer means for transferring the first film at a first speed; second transfer means for transferring the first film at a second speed slower than the first speed; accumulator means for storing the bonded films, and the first transfer means being used for storing the films in the accumulator means.

10. An apparatus for manufacturing laminated material, the apparatus comprising:

delivery means for delivering first and second long sheet-like members, each having a number of slits along the length, the first and second sheet-like members comprising first and second films, respectively;

the delivery means comprising first guide means for feeding the first film in a substantially vertical direction, and second guide means for suspending the second film along the first film;

the first guide means comprising upper guide means for guiding the first film downwardly and lower guide means for forming a vertical feeding portion of the first film between the upper guide means;

the second guide means comprising a weight which is attached to the front end of the second film and support means for supporting the second film so that the front end of the second film is vertically suspended along the vertical feeding portion of the first film;

bonding means for overlapping and bonding the rear end of the first film with the front end of the second film;

the bonding means comprising heating means and receiving means which face each other and are accessible to each other, the first and second films passing between the heating and the receiving means, each comprising one or more heating and receiving portions respectively;

compression means for compressing and bonding the web with another base material with heat to form a reticulate material;

said first and second films are comprised of a net-like material;

said bonding means forming a continuous sheet which comprises a first portion of a single layer of the first sheet-like member, a second portion of two layers in which the first sheet-like member is bonded to the second sheet-like member, and a third portion of a single layer of the second sheet-like member;

the bonding means further comprising an air spray duct for cooling and solidifying the film, a first wire heater for cutting the rear end of the first film with fusing and a second wire heater for cutting the front end of the second film with fusing, said first and second films having bonded portions in overlapped condition adjacent the front end of the second film and adjacent the rear end of the first film, respectively, said first wire heater adapted for cutting off the front end of the second film from said bonded portion of said second film, and said second wire heater adapted for cutting off the rear end of the first film from said bonded portion of said first film;

spreading means for continuously spreading the sheet which comprised said first, second and third portions to form a web.

11. An apparatus as defined in claim 10 wherein the compression means comprises a feed roll for heating the web and another base material, and a rubber roll for pressing the web and another base material.

12. An apparatus as defined in claim 10 further comprising first transfer means for transferring the first film at a first speed; second transfer means for transferring the first film at a second speed slower than the first speed; accumulator means for storing the bonded films, and the first transfer means being used for storing the films in the accumulator means.

13. A method of bonding webs, comprising the steps of:

transferring a first long sheet-like member having a number of slits along its length at a first speed;

transferring a portion along its length of the first sheet-like member at a second speed lower than the first speed to store it in an accumulator, thereby temporarily stopping a rear end of the first sheet-like member opposing to bonding means and substantially along a vertical direction;

suspending a front end of the second sheet-like member which has a number of slits along its length, the front end having a weight, vertically along a rear end of the first sheet-like member;

bonding the rear end of the first sheet-like member to the front end of the second sheet-like member by melting with the bonding means;

cutting off a portion behind the bonded portion of the rear end of the first sheet-like member and cutting off a portion before the bonded portion of the front end of the second sheet-like member; and continuously spreading the bonded first and second sheet-like members during transfer at the first speed.

* * * * *